(12) United States Patent
Ayoub et al.

(10) Patent No.: US 9,132,354 B2
(45) Date of Patent: Sep. 15, 2015

(54) GAME HAVING A PLURALITY OF ENGINES

(75) Inventors: Daniel M. Ayoub, Kirkland, WA (US);
Gregory A. Hermann, Renton, WA (US); Dennis W. Ries, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 13/334,856

(22) Filed: Dec. 22, 2011

(65) Prior Publication Data
US 2013/0165224 A1 Jun. 27, 2013

(51) Int. Cl.
*A63F 13/52* (2014.01)
*A63F 13/30* (2014.01)

(52) U.S. Cl.
CPC ............... *A63F 13/52* (2014.09); *A63F 13/12* (2013.01); *A63F 2300/203* (2013.01); *A63F 2300/403* (2013.01); *A63F 2300/405* (2013.01); *A63F 2300/538* (2013.01)

(58) Field of Classification Search
CPC .. A63F 13/52; A63F 2300/30; A63F 2300/60
USPC ...................................... 463/30–34
See application file for complete search history.

(56) References Cited

U.S. PATENT DOCUMENTS

| | | | | |
|---|---|---|---|---|
| 6,456,977 B1 * | 9/2002 | Wang | | 704/275 |
| 6,529,875 B1 * | 3/2003 | Nakajima et al. | | 704/275 |
| 6,928,329 B1 * | 8/2005 | Giaimo et al. | | 700/94 |
| 6,955,606 B2 * | 10/2005 | Taho et al. | | 463/43 |
| 7,243,363 B1 * | 7/2007 | Ohba | | 725/80 |
| 7,285,051 B2 * | 10/2007 | Eguchi et al. | | 463/43 |
| 7,465,231 B2 * | 12/2008 | Lewin et al. | | 463/37 |
| 7,837,558 B2 * | 11/2010 | Yoshino et al. | | 463/32 |
| 7,988,556 B2 * | 8/2011 | Yoshino et al. | | 463/31 |
| 2006/0080702 A1 * | 4/2006 | Diez et al. | | 725/30 |
| 2006/0136964 A1 * | 6/2006 | Diez et al. | | 725/37 |
| 2006/0249010 A1 * | 11/2006 | John et al. | | 89/1.11 |
| 2007/0015574 A1 * | 1/2007 | Vale et al. | | 463/30 |
| 2008/0081697 A1 * | 4/2008 | Domville et al. | | 463/42 |
| 2008/0102923 A1 * | 5/2008 | Esses et al. | | 463/20 |
| 2008/0132331 A1 | 6/2008 | Gatto et al. | | |
| 2009/0098920 A1 * | 4/2009 | Toompere | | 463/16 |
| 2009/0124387 A1 | 5/2009 | Perlman et al. | | |
| 2010/0041479 A1 * | 2/2010 | Hsu | | 463/36 |
| 2011/0077076 A1 | 3/2011 | Kalson et al. | | |

OTHER PUBLICATIONS

Becky Waxmax, In with the Old: The Classics and Adventure Gaming, Gameboomers (Dec. 4, 2010), http://web.archive.org/web/20101204074836/http://www.gameboomers.com/Editorial/Inwiththeold/InwiththeOld.htm.*

(Continued)

*Primary Examiner* — Bach Hoang
(74) *Attorney, Agent, or Firm* — Aaron Chatterjee; Kate Drakos; Micky Minhas (57) ABSTRACT

A game having a plurality of engines is described. In one or more implementations, a computing device displays an output of a first engine of a game by a computing device. An input is received by the computing device to switch from the output of the first engine of the game to an output of a second engine of the game, the first and second engines being executed concurrently by the computing device. Responsive to the receipt of the input, the computing device switches from displaying of the output of the first engine of the game to displaying the output of the second engine of the game.

20 Claims, 7 Drawing Sheets

(56) References Cited

OTHER PUBLICATIONS

AppSpy, The Secret of Monkey Island Special Edition iPhone Gameplay Video Review, YouTube (Sep. 29, 2009) http://www.youtube.com/watch?v=SBOzRFsHofo ("AppSpy").*

Waxman, Becky, "In with the Old: The Classics and Adventure Gaming", Retrieved at <<http://www.gameboomers.com/Editorial/Inwiththeold/InwiththeOld.htm>>,Retrieved Date: Sep. 16, 2011, pp. 7.

Holzhauer, Grant, "Monkey Island 2 Special Edition: LeChuck's Revenge for iPAD", Retrieved at <<http://www.slidetoplay.com/story/monkey-island-2-special-edition-lechucks-revenge-for-ipad-review>>, Jul. 9, 2010, pp. 4.

Bamblakopz, "Microsoft—E3 2011 Review", Retrieved at << http://www.gameguidecentral.com/2011/06/xbox-360-e3-2011-review/>>, Jun. 6, 2011, pp. 6.

Masuch, et al., "Game Graphics Beyond Realism: Then, Now, and Tomorrow", Retrieved at <<http://www.digra.org/dl/db/05150.48223.pdf>>, 2005, pp. 12.

Li, Frederick, W.B., "Computer Games", Retrieved at <<http://citeseerx.ist.psu.edu/viewdoc/download?doi=10.1.1.101.4272&rep=rep1&type=pdf>>, Published Date: Dec. 14, 2007, pp. 15.

* cited by examiner

GAME HAVING A PLURALITY OF ENGINES

BACKGROUND

Gamers may feel a significant amount of nostalgia for the games that they "grew up playing." These emotions may run deep as the users may fondly remember the original look and feel of the games that originally made them interested in gaming.

Developers have attempted to capitalize on this nostalgia through re-releases of the game. These re-releases may apply modern techniques to the games, such as to improve rendering, animations, controls, and other visual and audio qualities of the original game. However, these re-releases have sometimes met with a rather lukewarm reception from the garners because the game experience became divorced from the original experience. As such, the modern version of the game may lose the nostalgia the garners felt for the original game using conventional techniques.

SUMMARY

A game having a plurality of engines is described. In one or more implementations, a computing device displays an output of a first engine of a game by a computing device. An input is received by the computing device to switch from the output of the first engine of the game to an output of a second engine of the game, the first and second engines being executed concurrently by the computing device. Responsive to the receipt of the input, the computing device switches from displaying of the output of the first engine of the game to displaying the output of the second engine of the game.

In one or more implementations, a system includes a first engine of a game configured for execution by a computing device and a second engine of the game configured for execution with the first game engine, the execution of the first and second game engines synchronized to execute corresponding portions of the game concurrently by the computing device.

In one or more implementations, one or more computer-readable storage media comprise instructions stored thereon that responsive to execution by a computing device causes the computing device to perform operations comprising providing a rendered output of a classic engine of a game for display on a display device communicatively coupled to the computing device; responsive to receipt of an input during the providing of the rendered output of the classic engine, switching from the providing of the rendered output of the classic engine of the game to providing a rendered output of a modern engine of the game for display on the display device; and responsive to receipt of an input during the providing of the rendered output of the modern engine, switching from the providing of the rendered output of the modern engine of the game to providing the rendered output of a classic engine of the game for display on the display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Remakes of games attempt to captivate their audiences by leveraging the emotions associated with the initial game. However, this may be lost as modern graphics may cause the gamers to lose that feeling of nostalgia. Thus, the very purpose for the re-release of the game may be lost by the "improvements" made to the game.

Techniques are described involving a game having a plurality of engines. In one or more implementations, the techniques described herein may support a system in which a plurality of engines are provided for execution of a game, and may be done concurrently such that the execution of the engines is synchronized. Each of the engines may be configured to provide an output that is sufficient to play the game, e.g., provide graphics and/or audio. Therefore, these techniques may support functionality in which a user may switch back and forth between the respective outputs of the engines. This may be used to support a variety of functionality.

The engines, for example, may be configured as classic and modern engines, respectively. The classic engine may provide an output consistent with the original look and feel of the game. The modern engine, however, may leverage rendering and animation techniques that have been developed after the classic version of the game to give a modern look and feel to the game. Through synchronization of the engines, a user may be provided the ability to switch back and forth between the engines in real time, and therefore may view the game however desired. In this way, the game may leverage the nostalgia of the original version yet still apply modern techniques to the game. Other examples are also contemplated, further discussion of which may be found in relation to the following figures.

In the following discussion, an example environment is first described that is operable to employ the techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
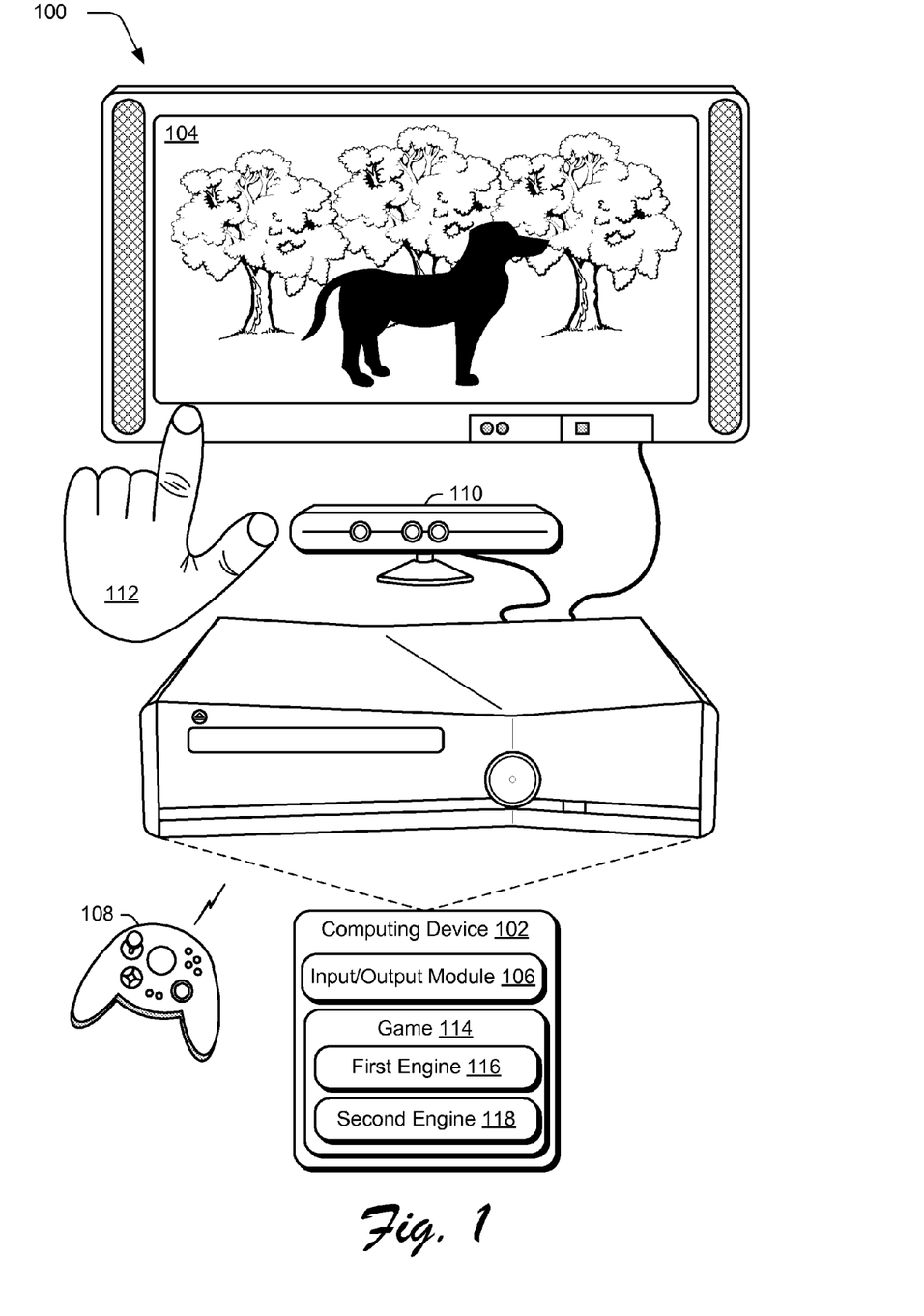
FIG. 1 is an illustration of an environment in an example implementation that is operable to employ game engine techniques described herein.

FIG. 1 is an illustration of an environment 100 in an example implementation that is operable to employ game engine techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, a wireless phone, a tablet, a netbook, and so forth as further described in relation to FIG. 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, to identify gestures and cause operations to be performed that correspond to the gestures, and so on. In one or more implementations, the input/output module 106 may be configured as part of an operating system of the computing device 102, although other implementations are also contemplated.

The inputs may be detected by the input/output module 106 in a variety of different ways. For example, the input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102), and other devices that involve touch on the part of a user or object.

The input/output module 106 may also be configured to provide a natural user interface (NUI) that may recognize interactions that may not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures, presented objects, images, and so on through use of a camera. The camera, for instance, may be configured to include multiple lenses so that different perspectives may be captured and thus determine depth. The different perspectives, for instance, may be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 112 and/or movement of the user's hand 112 as a whole. The motions may be identified as gestures by the input/output module 106 to initiate a corresponding operation.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices, such as to employ touchscreen functionality of a tablet computer.

The computing device 102 is further illustrated as including a game 114. The game 114 is configured for execution by the computing device 102 to provide a gaming experience for a user. A user may interact with the computing device 102 as part of this experience in a variety of ways, such as through touch input using a controller 108 or other touch device, through use of a camera such as the NUI input device 110, and so on.

The game is illustrated as including first and second engines 116, 118, although additional engines are also contemplated. The first and second engines 116, 118 are representative of game engines that may be used to support the gaming experience. For example, the game engines may be used to provide a rendering engine, address physics for objects in the game (e.g., collisions between objects), sound, animation, artificial intelligence, memory management, threading, and control of which scenes and portions of the scene are output. Thus, the first and second engines 116, 118 provide the foundation for the output of the game 114, itself. Further, each of the first and second engines 116, 118 may be used, separately and alone, to provide an output of the game that is sufficient to support user interaction with the game 114.

The use of a plurality of engines by the game 114 may be used to support a variety of different types of functionality. For example, the first and second engines 116, 118 may be used to execute different versions of the game 114 such that an ordering of scenes and supported interactions remain similar but what is output is changed. Further, this execution may be performed synchronized such that execution of corresponding portions of the game appears to be performed concurrently, which may thereby support real time switching between the engines. For example, concurrent execution may involve use of multiple cores, successive execution of interleaved code used to support the first and second engines through a hybrid model, and so on. Thus, this may support a game experience that may involve changing from racing cars to racing horses, medieval versus western themes, switching from a classic to modern version of the game, and so on, additional discussion of which may be found in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the game techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
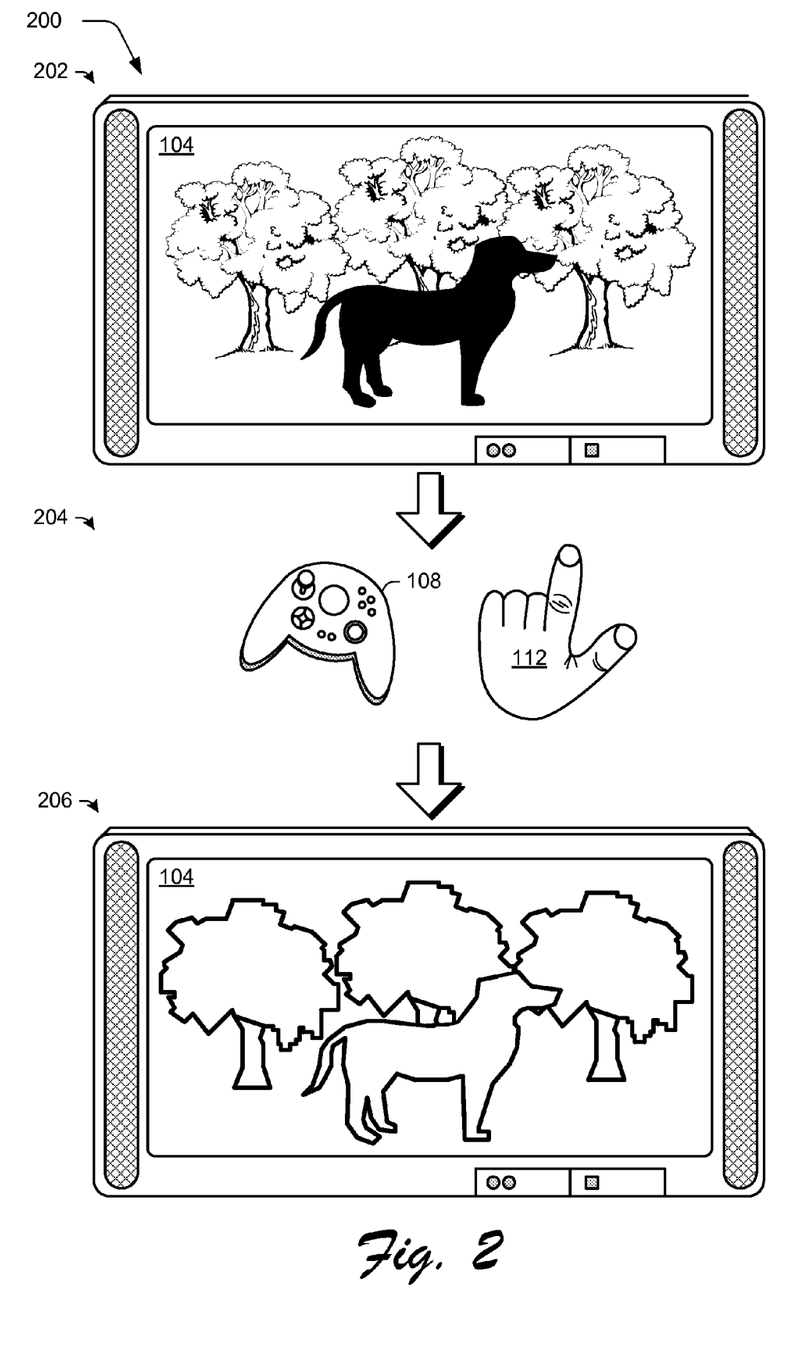
FIG. 2 depicts a system in an example implementation in which switching between an output of first and second engines of FIG. 1 is shown.

FIG. 2 depicts a system 200 in an example implementation in which switching between an output of the first and second engines of FIG. 1 is shown. This system 200 is shown through first, second, and third stages 202, 204, 206. At the first stage 202, an output of the first engine 116 of the game 114 of FIG. 1 is illustrated as outputting a modern version of the game 214. This may include use of modern rendering and animation techniques (e.g., through use of an increased number of polygons) such that the output has increased realism.

At the second stage 206, an input is received during the output of the first engine 116. The input may be originated in a variety of ways, such as through a button of the controller 108 (e.g., a back button), a gesture recognized through movements of one or more parts of a user's body (e.g., a user's hand 112) that is captured using a camera, and so on.

In response to detection of the input, the computing device 102 may switch from an output of the first engine 116 to an output of the second engine 118 as shown in the third stage 206. In this example, the second engine 118 is configured as a classic engine and therefore employs classic techniques to render and animate the game 114, such as to simulate and even incorporate techniques for an originally-released version of the game 114. This process may be repeated by the user to switch back to the modern version of the game. Thus, the switching may be performed in real time between the engines by the user as desired, which may be supported through concurrent execution of the engines as further described in relation to FIG. 3. In this way, the modern engine may support an improved user experience yet the classic engine may support the user's feeling of nostalgia.

In this example, the switching was performed such that the output of the first engine 116 was replaced by the output of the second engine 118 of the game and vice versa. A variety of other examples are also contemplated. For example, the computing device 102 may support a split-screen display in which the display area of the display device is divided into two or more portions, e.g., horizontally, vertically, and so on. Output from the first engine 116 may be displayed in a first portion of the display device 104, for instance, and output from the second engine 118 may be displayed in a second portion of the display device 104, and so on. The switching may then be performed such that one of the portions is made the primary portion for output. This may include pausing the display in one portion while continuing the display in the second portion, displaying the visual outputs simultaneously along with one of the audio outputs, e.g., the audio output of the modern engine, and so forth.

Figure 3:
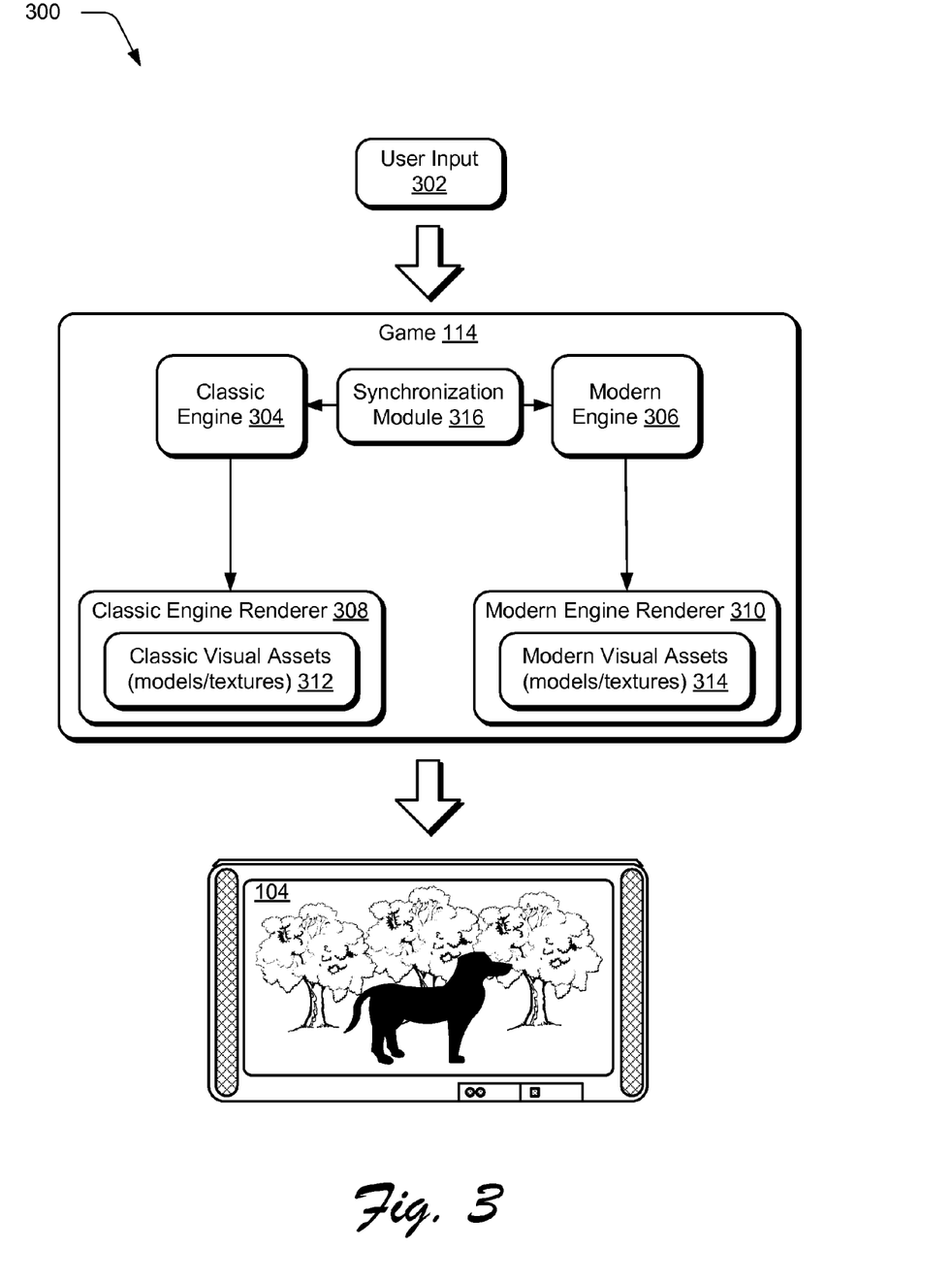
FIG. 3 depicts a system in an example implementation showing execution of a game of FIG. 1 in greater detail as having classic and modern engines.

FIG. 3 depicts a system 300 in an example implementation showing execution of the game 114 of FIG. 1 in greater detail as having classic and modern engines. A user input 302 is received by the game 114 in this example. As before, the user input may originate in a variety of ways, such as through a pressing a button of a controller 108 or other hardware device, detection using touchscreen functionality (e.g., a gesture), detection using a camera (e.g., a depth sensing camera such as that of the NUI input device 110 or other camera), and so forth.

The game 114 in this example includes a classic engine 304 and a modern engine 306, each having a corresponding classic engine renderer 308 and modern engine renderer 310. These modules, as previously described, may be used for artificial intelligence, collision detection, and rendering of corresponding game objects, such as classic visual assets (e.g., models/textures) 312 for the classic engine renderer 308 and modern visual assets (e.g., models/textures) 314 for the modern engine renderer 310. In one example, differences between the classic and modern engine includes resolution, number of polygons supported, support of different animations techniques, textures, models, and so on. As previously described, the engines are not limited to use as classic and modern as described in this example.

The game 114 is also illustrated as including a synchronization module 316 that is representative of functionality to synchronize the output of the classic and modern engines 304, 306. This synchronization may be performed in a variety of ways, such as to ensure that corresponding portions of the game 114 are processed by the classic and modern engines 304, 306. A user, for example, may pause the game 114, "skip" to a different portion of the game 114, and so on. Through synchronization of the engines, however, this navigation may be addressed such that the engines may support real time switching, thereby providing a unified experience to the user. Further discussion of use of the engines may be found in relation to the following procedures.

Example Procedures

The following discussion describes laser mode techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
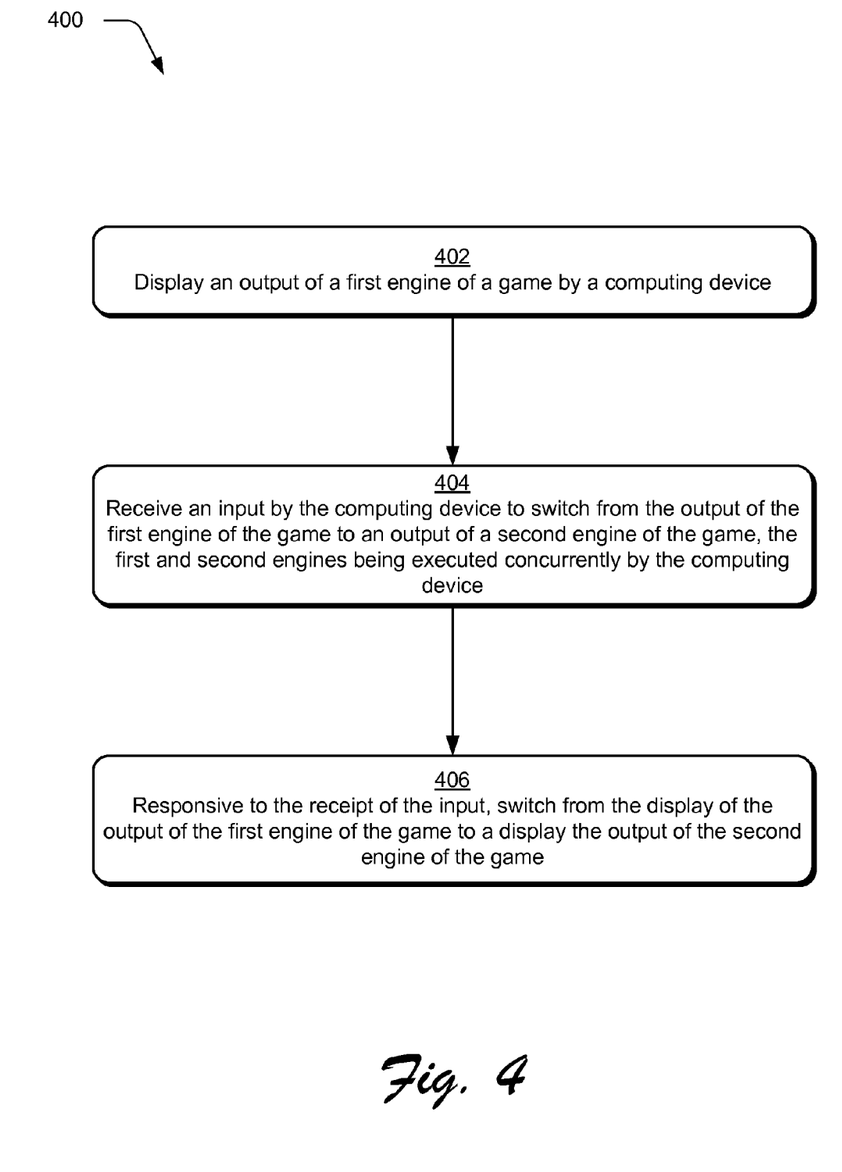
FIG. 4 is a flow diagram depicting a procedure in an example implementation in which switching is performed between outputs of a plurality of engines for a single game.

FIG. 4 depicts a procedure 400 in an example implementation in which switching is performed between outputs of a plurality of engines for a single game. A computing device displays an output of a first engine of a game by a computing device (block 402). The first engine, for instance, may be configured to provide a complete game experience that is output for use interaction as previously described.

An input is received by the computing device to switch from the output of the first engine of the game to an output of a second engine of the game, the first and second engines being executed concurrently by the computing device (block 404). The input, for instance, may be received as the output from the first engine 116 is displayed on the display device 104. As before, the input may be provided in a variety of ways, such as a controller 108, NUI input device 110, and so on.

Responsive to the receipt of the input, the computing device switches from displaying of the output of the first engine of the game to displaying the output of the second engine of the game (block 406). This switch may be performed in real time and at corresponding portions in the output of the game such that a storyline of the game is consistent but the visuals and/or audio is changed.

Figure 5:
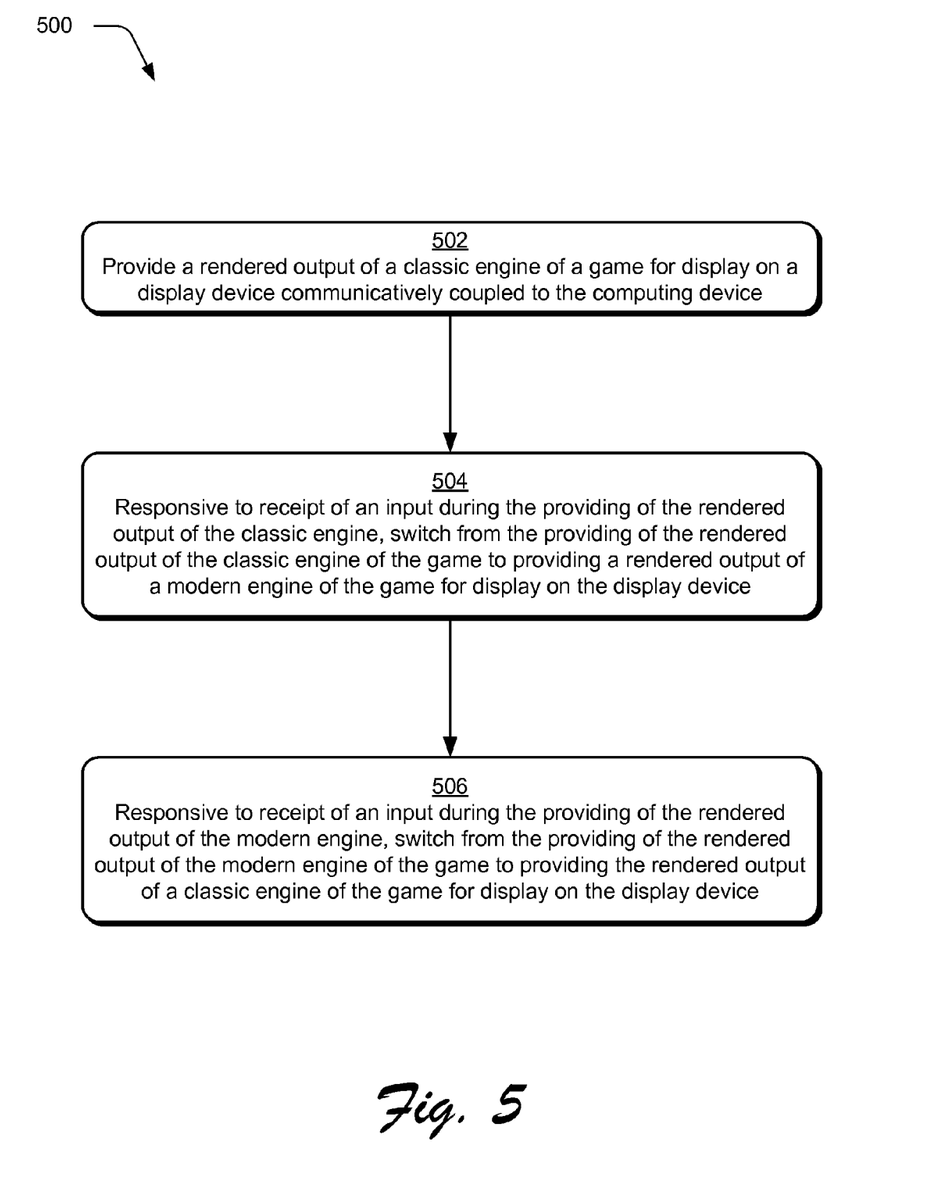
FIG. 5 is a flow diagram depicting a procedure in an example implementation in which a switch is performed between classic and modern engines of a game.

FIG. 5 depicts a procedure 500 in an example implementation in which a switch is performed between classic and modern engines of a game. A rendered output of a classic engine of a game is provided for display on a display device communicatively coupled to the computing device (block 502). The classic engine 304 and corresponding classic engine renderer 308 of the game 114 may be configured to provide an output using classic models and textures.

Responsive to receipt of an input during the providing of the rendered output of the classic engine, a switch is made from the providing of the rendered output of the classic engine of the game to providing a rendered output of a modern engine of the game for display on the display device (block 504). In this example, the switch is made to the modern engine 306 and modern engine renderer 310 of the game 114 to provide an output using modern visual assets 314 including models and textures.

Responsive to receipt of an input during the providing of the rendered output of the modern engine, a switch is made from the providing of the rendered output of the modern engine of the game to providing the rendered output of a classic engine of the game for display on the display device (block 506). Thus, at this point a user may "switch back" to the classic engine 304 and classic engine renderer 308. In this way, the near simultaneous execution of the classic engine 304 and modern engine 306 may be used to support real time switching. A variety of other examples are also contemplated as previously described.

Example System and Device

Figure 6:
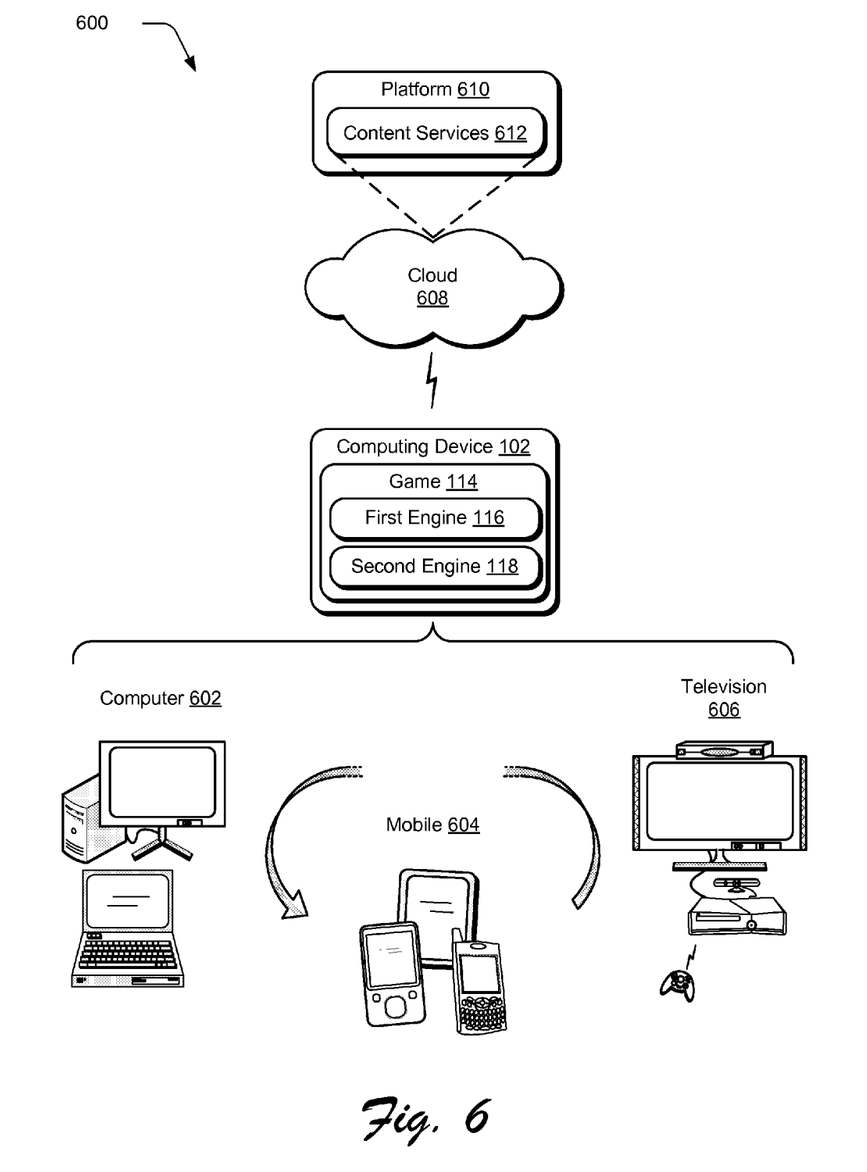
FIG. 6 illustrates an example system that illustrated various configuration of a computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 604 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the game 114 and the first and second engines 116, 118 on the computing device 102. These techniques may also be supported "over the could" by a platform 610 as described below.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
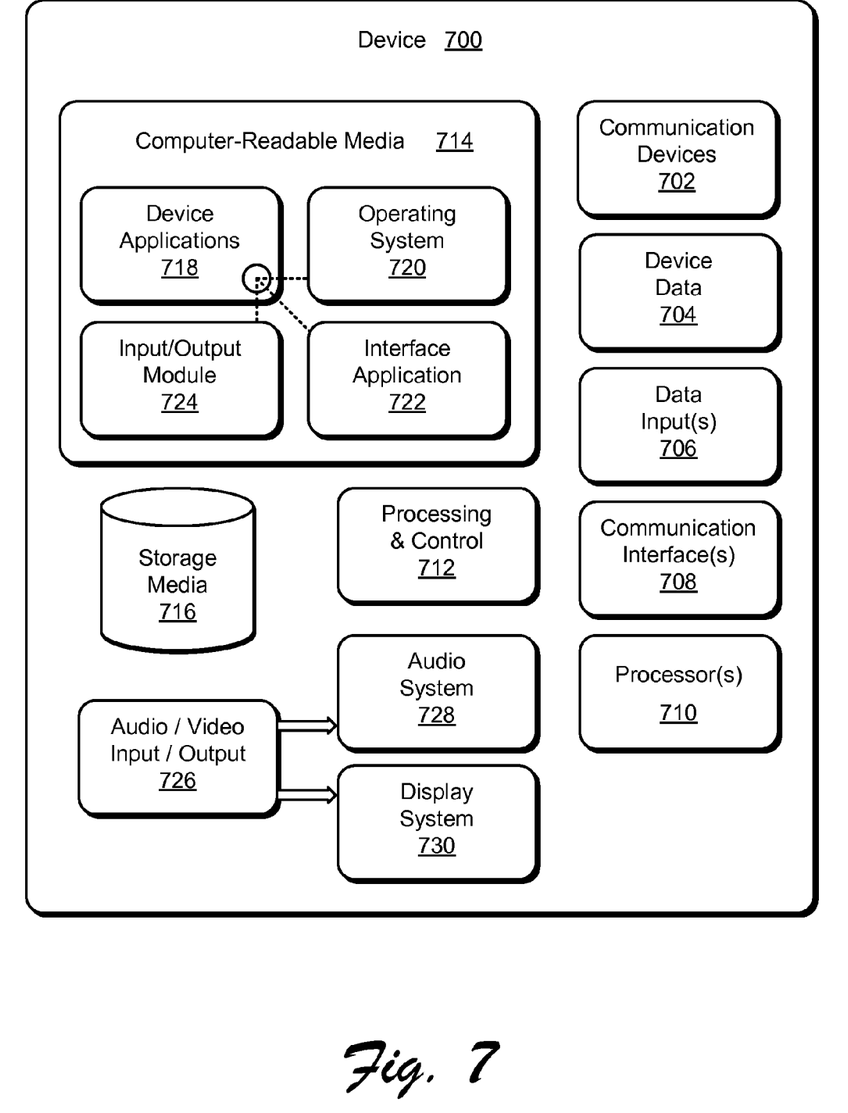
FIG. 7 illustrates various components of an example device that can be implemented as any type of portable and/or computer device as described with reference to FIGS. 1-3 and 6 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device that includes a processor, the method comprising:
displaying first graphics provided by a first engine of a game in a portion of a display device coupled to the computing device;
displaying second graphics provided by a second engine of the game in another portion of the display device, the game being configured for execution using both the first engine and the second engine such that the first engine provides the first graphics and first audio corresponding to a first version of the game and the second engine provides the second graphics and second audio corresponding to a second version of the game;
receiving an input by the computing device to switch from simultaneously displaying the first graphics of the first engine and the second graphics of the second engine to displaying solely the second graphics provided by the second engine, the first and second engines being executed concurrently by the computing device; and
responsive to the receiving, switching, at the computing device, from the simultaneous displaying of the first graphics of the first engine and the second graphics of the second engine to displaying solely the second graphics and outputting the first audio provided by the first engine.

2. A method as described in claim 1, wherein the first engine is executed concurrently with the second engine during the displaying solely the second graphics provided by the second engine.

3. A method as described in claim 1, wherein the switching includes replacing the displaying the first graphics of the first engine and the second graphics of the second engine with the displaying solely the second graphics of the second engine of the game.

4. A method as described in claim 1, wherein the concurrent execution of the first and second engines enables the switching to be performed in real time.

5. A method as described in claim 1, wherein the concurrent execution of the first and second engines is synchronized such that the first and second engines execute corresponding versions of the game concurrently.

6. A method as described in claim 5, wherein the concurrent execution is synchronized at a frame-by-frame rate.

7. A method as described in claim 1, the first version being an earlier version of the game than the second version.

8. A method as described in claim 1, wherein the input is captured via a game controller, keyboard, touchscreen functionality, or a camera.

9. A system comprising:
a first engine of a game configured for execution by a computing device to output first graphics and first audio corresponding to a first version of the game;
a second engine of the game configured for execution with the first game engine by the computing device, the second engine being configured to provide second graphics and second audio corresponding to a second version of the game; and
a synchronization module of the game configured for synchronizing output of the first and second engines such that the first graphics of the first engine and the second graphics of the second engine switch from simultaneous display to displaying solely the second graphics and outputting the first audio provided by the first engine.

10. A system as described in claim 9, wherein the first graphics of the first engine and the second graphics of the second engine switch from simultaneous display to displaying solely the second graphics responsive to an input received by the computing device.

11. A system as described in claim 10, wherein the switching includes replacing the first graphics of the first engine of the game with the second graphics of the second engine of the game.

12. A system as described in claim 10, wherein the execution of the first and second engines is configured to be performed concurrently to enable the switching to be performed in real time.

13. A system as described in claim 9, wherein the execution is synchronized at a frame-by-frame rate.

14. A system as described in claim 9, the first version being an earlier version of the game than the second version.

15. One or more computer-readable storage devices comprising instructions stored thereon that responsive to execution by a computing device causes the computing device to perform operations comprising:
displaying first graphics of a first engine of a game on a portion of a display device coupled to the computing device;
displaying second graphics of a second engine of the game on another portion of the display device, the game being configured for execution using both the first engine and the second engine such that the first engine provides the first graphics and first audio corresponding to a first version of the game and the second engine provides the second graphics and second audio corresponding to a second version of the game;
receiving an input by the computing device to switch from simultaneously displaying the first graphics of the first engine and the second graphics of the second engine to displaying solely the second graphics provided by the second engine, the first and second engines being executed concurrently by the computing device; and
responsive to the receiving, switching, at the computing device, from the simultaneous displaying of the first graphics of the first engine and the second graphics of the second engine to displaying solely the second graphics and outputting the first audio provided by the first engine.

16. One or more computer-readable storage devices as described in claim 15, wherein the concurrent execution of the first and second engines enables the switching to be performed in real time.

17. One or more computer-readable storage devices as described in claim 15, wherein execution of the first and second engines is synchronized to execute corresponding portions of the game concurrently by the computing device, respectively.

18. One or more computer-readable storage devices as described in claim 15, wherein the second engine of the game corresponds to an earlier version of the game than the first engine of the game.

19. One or more computer-readable storage devices as described in claim 15, wherein the first engine of the game corresponds to an earlier version than the second engine of the game.

20. One or more computer-readable storage devices as described in claim 15, wherein the first and second engines correspond to different versions of a single game.

* * * * *